US012793591B2

(12) United States Patent
Li et al.

(10) Patent No.: US 12,793,591 B2
(45) Date of Patent: Nov. 10, 2026

(54) FAULT DETECTION CIRCUIT, DISPLAY PANEL, AND METHOD FOR FAULT DETECTION

(71) Applicant: HKC CORPORATION LIMITED, Shenzhen (CN)

(72) Inventors: Zeyao Li, Shenzhen (CN); Rongrong Li, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 19/336,168

(22) Filed: Sep. 22, 2025

(65) Prior Publication Data

US 2026/0018093 A1 Jan. 15, 2026

Related U.S. Application Data

(63) Continuation of application No. PCT/CN2023/117487, filed on Sep. 7, 2023.

(30) Foreign Application Priority Data

Apr. 4, 2023 (CN) ........................ 202310350800.5

(51) Int. Cl.
*G09G 3/00* (2006.01)
*G09G 3/34* (2006.01)

(52) U.S. Cl.
CPC ............. *G09G 3/006* (2013.01); *G09G 3/344* (2013.01); *G09G 2300/0426* (2013.01); *G09G 2310/0267* (2013.01); *G09G 2310/0275* (2013.01); *G09G 2330/10* (2013.01); *G09G 2330/12* (2013.01)

(58) Field of Classification Search
CPC .................. G09G 3/006; G09G 3/344; G09G 2300/0426; G09G 2310/0267; G09G 2310/0275; G09G 2330/10; G09G 2330/12; G09G 3/20; G09G 3/36
See application file for complete search history.

(56) References Cited

U.S. PATENT DOCUMENTS 7,199,602 B2 * 4/2007 Nara ...................... G09G 3/006 324/762.09
2005/0204219 A1 9/2005 Taguchi et al.
2007/0234151 A1 10/2007 Hsu et al.
(Continued)

FOREIGN PATENT DOCUMENTS

CA 2164373 A1 6/1996
CN 104992651 A 10/2015
(Continued)

OTHER PUBLICATIONS

WIPO, International Search Report and Written Opinion for International Application No. PCT/CN2023/117487, Nov. 20, 2023.
(Continued)

*Primary Examiner* — Temesghen Ghebretinsae
*Assistant Examiner* — Ivelisse Martinez Quiles
(74) *Attorney, Agent, or Firm* — HAUPTMAN HAM, LLP

(57) ABSTRACT

A fault detection circuit, a display panel, and a method for fault detection are provided. The fault detection circuit includes a first detection unit and a second detection unit. The first detection unit performs a short-circuit detection on a pixel unit. If the pixel unit display abnormally, the second detection unit re-execute the detection on the pixel unit.

20 Claims, 8 Drawing Sheets

(56) References Cited

U.S. PATENT DOCUMENTS

| | | | | |
|---|---|---|---|---|
| 2020/0152101 | A1* | 5/2020 | Li | G09G 3/006 |
| 2025/0078746 | A1* | 3/2025 | Zhang | G09G 3/00 |

FOREIGN PATENT DOCUMENTS

| | | | |
|---|---|---|---|
| CN | 207458545 | U | 6/2018 |
| CN | 207781148 | U | 8/2018 |
| CN | 109345988 | A | 2/2019 |
| CN | 110580869 | A | 12/2019 |
| CN | 111179794 | A | 5/2020 |
| CN | 111524197 | A | 8/2020 |
| CN | 111986597 | A | 11/2020 |

OTHER PUBLICATIONS

The first office action issued in corresponding CN application No. 202310350800.5 dated May 21, 2023.

* cited by examiner

FAULT DETECTION CIRCUIT, DISPLAY PANEL, AND METHOD FOR FAULT DETECTION

CROSS-REFERENCE TO RELATED APPLICATIONS

This application is a continuation of International Application No. PCT/CN2023/117487, filed Sep. 7, 2023, which claims priority to Chinese Patent Application No. CN202310350800.5, filed Apr. 4, 2023, the entire disclosures of both of which are incorporated herein by reference.

TECHNICAL FIELD

The present disclosure relates to the field of display technology, in particular, to a fault detection circuit, a display panel, and a method for fault detection.

BACKGROUND

Electronic ink technology, i.e., electronic paper display (EPD) is a new technology requiring ambient lights for display. According to a principle of the EPD technology, charged black particles and charged white particles are encapsulated in a micro-capsule structure, and the black particles and the white particles with different charges are moved up and down under the control of an external electric field, in order to display black color or white color. Under the action of the electric field, black ink drops and white ink drops keep moving. When the white ink drops rise to an upper surface, the ambient lights incident on the upper surface are completely reflected, such that a state of white color is presented. The black ink drops and the white ink drops are mixed in proportion to form different colors such as black, white, and colors with different grayscales.

Currently, fault detection on the electronic paper display panel is performed by setting transistors to drive data lines and scan lines respectively, and determining whether the whole display region is normal according to the display effect of the display panel. However, this kind of detection involves directly detecting a display region of a finished electronic paper. When an anomaly is detected, reassembling and disassembling the electronic paper may damage the pixel units of the electronic paper film in the display region and the integrated circuits that are used to drive the pixel units, resulting in a waste of resources. Therefore, how to conduct a detection before the electronic paper is finished to improve the accuracy of detection is a problem to be solved.

SUMMARY

The disclosure provides a fault detection circuit, which is applicable to a display panel including multiple pixel units for image display. The fault detection circuit includes a first detection unit, a second detection unit, and a control unit. The control unit is connected to the first detection unit and the second detection unit. The first detection unit is configured to perform a short-circuit detection or an open-circuit detection on the pixel units in the display panel under the control of the control unit. If at least one pixel unit displays abnormally and is determined as a first abnormal pixel unit, the control unit is configured to control the second detection unit to re-execute the detection. If the second detection unit detects that the first abnormal pixel unit displays normally, the first detection unit is determined to be faulty. If the second detection unit detects that the first abnormal pixel unit displays abnormally, the first abnormal pixel unit is determined to be faulty.

The disclosure further provides a display panel, including a data driving circuit, a scan driving circuit, multiple pixel units arranged in an array, and the above-mentioned fault detection circuit. The scan driving circuit is configured to output a scan signal to the pixel units, the data driving circuit is configured to output a data signal to the pixel units, the pixel units are configured to receive the data signal to perform image display under control of the scan signal, and the fault detection circuit is configured to perform a short-circuit detection or an open-circuit detection on the pixel units.

The disclosure further provides a method for fault detection, which is applicable to the above fault detection circuit. The method for fault detection includes the following. The first detection unit is controlled to perform a short-circuit detection or an open-circuit detection on the pixel units in the display panel. If the first detection unit detects that all the pixel units display normally, the pixel units are determined to be not faulty. If the first detection unit detects that at least one pixel unit displays abnormally, the at least one pixel unit is determined as a first abnormal pixel unit and the second detection unit is controlled to re-execute the detection. If the second detection unit detects that the first abnormal pixel unit displays normally, the first detection unit is determined to be faulty. If the second detection unit detects that the first abnormal pixel unit display abnormally, the first abnormal pixel unit is determined to be faulty.

BRIEF DESCRIPTION OF THE DRAWINGS

In order to describe technical solutions in embodiments of the disclosure more clearly, the following will give a brief introduction to the accompanying drawings required for describing the embodiments. Apparently, the accompanying drawings hereinafter described are merely some embodiments of the disclosure. Based on these drawings, those of ordinary skill in the art can also obtain other drawings without creative effort.

DETAILED DESCRIPTION

Figure 1:
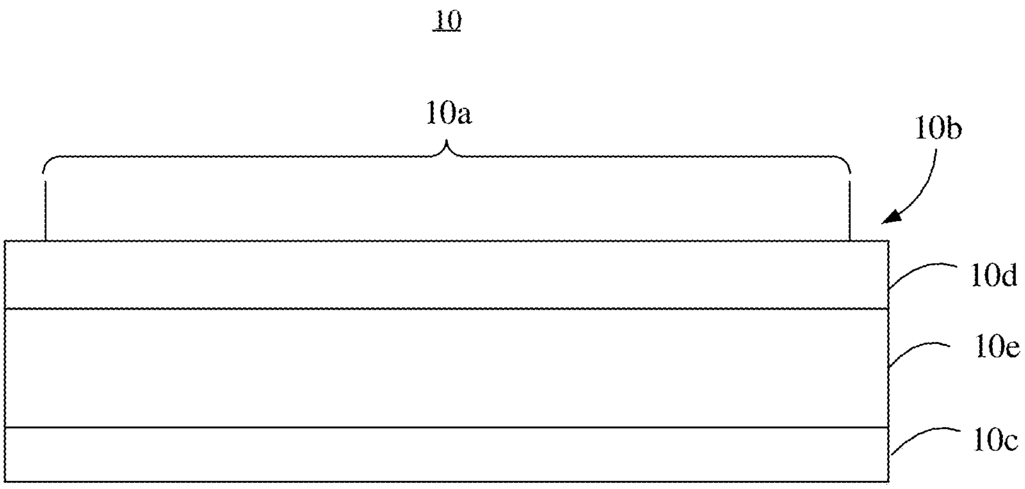
FIG. 1 is schematic side structural view of a display panel provided in embodiments of the disclosure.

In order to facilitate understanding of the present disclosure, a detailed description will now be given with reference to relevant accompanying drawings. The accompanying drawings illustrate some preferred embodiments of the present disclosure. However, the present disclosure can be implemented in many different forms and is not limited to the embodiments described herein. On the contrary, these embodiments are provided for a more thorough and comprehensive understanding of the present disclosure.

The following embodiments are described with reference to the accompanying drawings to exemplify particular embodiments that may be implemented by the disclosure. The serial numbers themselves, such as "first" and "second" and the like are used herein to distinguish the objects described, and do not have any sequential or technical meaning. The terms "connection" and "coupling" in the disclosure include direct and indirect connections (couplings), unless otherwise specified. Directional terms such as "up", "down", "front", "back", "left", "right", "inside", "outside", "side", and the like referred to herein are only directions with reference to the accompanying drawings. Therefore, the directional terms used herein are intended to better and more clearly illustrate and understand the disclosure, rather than explicitly or implicitly indicate that apparatus or components referred to herein must have a certain direction or be configured or operated in a certain direction and therefore cannot be understood as limitation on the disclosure.

It is noted that, in the description of the disclosure, terms "install", "couple", "connect", and "interconnect" should be understood in a broad sense unless otherwise expressly specified and limited. For example, the terms "install", "couple", "connect", and "interconnect" may refer to fixedly connect, detachably connect, or integrally connect, may refer to mechanically connect, and may refer to a directly connect, indirectly connect through an intermediate medium, or an intercommunicate interiors of two elements. For those of ordinary skill in the art, the specific meanings of the above terms in the disclosure can be understood according to specific situations. It is noted that, the terms such as "first" and "second" and the like in the specification, claims, and the accompanying drawings of the disclosure are used for distinguishing between different objects rather than describing a particular order. In addition, terms such as "include", "may include", "contain", or "may contain" used herein indicate the existence of the corresponding function, operation, element, etc. disclosed, and do not limit the other one or more further functions, operations, elements, etc. In addition, the term "include" or "contain" indicates the existence of the corresponding feature, number, step, operation, element, component, or combination thereof disclosed in the specification, without excluding the existence or addition of one or more other features, numbers, steps, operations, elements, components, or combinations thereof, and is intended to cover non-exclusive inclusion. It is to be further understood that "at least one" as described in present disclosure means one or more, such as one, two or three, and "a plurality of" means at least two, such as two or three, unless otherwise explicitly specified. The terms "step 1", "step 2", etc., in the description, claims, and the accompanying drawings of the present disclosure are used to distinguishing different objects, rather than to describe a specific order.

In the field of display technology, a display apparatus typically includes a display panel and a backlight module, where the display panel is mounted on a light-exit side of the backlight module, and the backlight module is configured to provide backlight to the display panel to adjust the display panel to display different images.

Reference is made to FIG. 1, which is schematic side structural view of a display panel provided in embodiments of the disclosure. As illustrated in FIG. 1, a display panel 10 includes a display region 10*a* for image display and a non-display region 10*b*. The display region 10*a* is configured to perform image display, and the non-display region 10*b* is arranged around a periphery of the display region 10*a* for the arrangement of other accessories and modules. In an embodiment, the display panel 10 includes an array substrate 10*c*, an opposite substrate 10*d*, and a display medium layer 10*e* sandwiched between the array substrate 10*c* and the opposite substrate 10*d*. The array substrate 10*c* and the opposite substrate 10*d* each include a driving element to generate corresponding electric fields according to a data signal (Data), so as to drive the display medium layer 10*e* to emit light with corresponding grayscales for image display.

Figure 2:
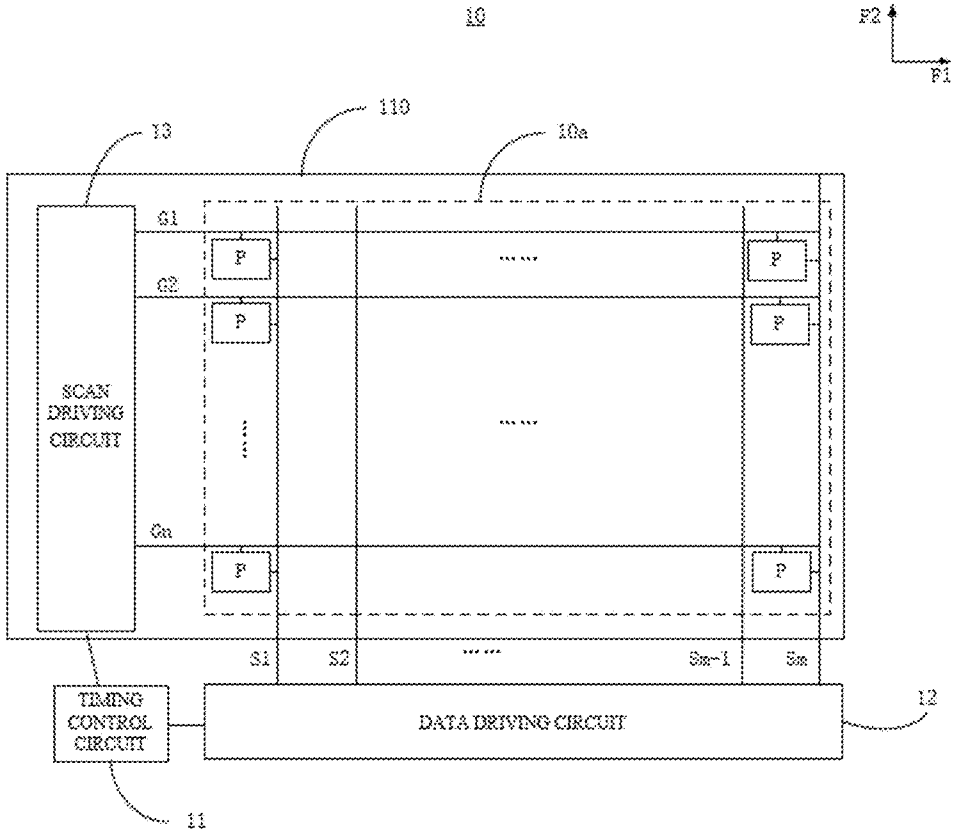
FIG. 2 is a schematic planar layout diagram of an array substrate of the display panel in FIG. 1.

Reference is made to FIG. 2, which is a schematic planar layout diagram of an array substrate of the display panel in FIG. 1. As illustrated in FIG. 2, the array substrate 10*c*, corresponding to the display region 10*a*, includes multiple pixel units P arranged in an m*n matrix, m data lines $S_1$~$S_m$, and n scan lines $G_1$~$G_n$, where m and n are both natural numbers greater than 1.

The n scan lines $G_1$~$G_n$ extend in a first direction F1 and are isolated from and parallel with one another in a second direction F2. The m data lines $S_1$~$S_m$ extend in the second direction F2 and are isolated from and parallel with one other in the first direction F1. The first direction F1 is perpendicular to the second direction F2.

In the non-display region 10*b* (FIG. 1) of the display panel 10, the display panel 10 further includes a timing control circuit 11 configured to drive the pixel units P to perform image display, a data driving circuit 12, and a scan driving circuit 13 arranged on the array substrate 10*c*.

The timing control circuit 11 is electrically connected to both the data driving circuit 12 and the scan driving circuit 13 to control operation timing of the data driving circuit 12 and the scan driving circuit 13, namely outputting corresponding timing control signals to the data driving circuit 12 and the scan driving circuit 13, so as to control the timing of outputting corresponding scan signals and data signals.

The data driving circuit 12 is electrically connected to the m data lines $S_1$~$S_m$, and is configured to transmit the data signals intended for display in the form of data voltages to the multiple pixel units P via the m data lines $S_1$~$S_m$.

The scan driving circuit 13 is electrically connected to the n scan lines $G_1$~$G_n$, and is configured to output the scan signals via the n scan lines $G_1$~$G_n$ to control the timing of the receiving the data signal by the pixel units P. The scan driving circuit 13 outputs, according to a scanning period and an arrangement order of the n scan lines $G_1$~$G_n$, the scan signals sequentially from the n scan lines $G_1$~$G_n$.

In the embodiment, circuit components in the scan driving circuit 13 and the pixel units P in the array substrate 10*c* are collectively manufactured on the array substrate 10*c* through the same manufacturing process, namely using the gate driver on array (GOA) technology.

Figure 3:
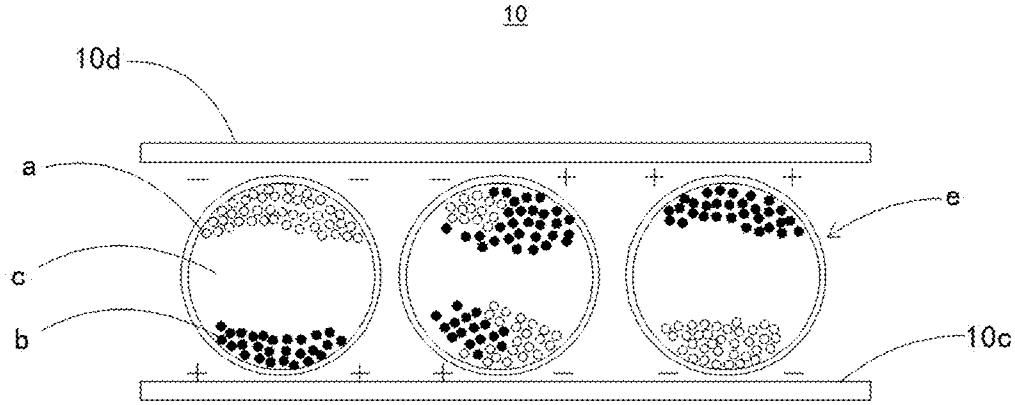
FIG. 3 is a schematic structural view of a display medium layer in FIG. 2.

Reference is made to FIG. 3, which is a schematic structural view of a display medium layer in FIG. 2.

As illustrated in FIG. 3, the display medium layer 10*e* is an electronic paper film, which includes multiple micro-liquid capsules e. The micro-liquid capsules e each is a sealed sphere. White particles a, black particles b, and a transparent dispersion medium c are encapsulated inside each of the micro-liquid capsules e. A white particle a and a black particle b carry different charges, for example, the white particle a is of a positive polarity and the black particle b is of a negative polarity, or the white particle a is of a negative polarity and the black particle b is of a positive polarity. The white particle a and the black particle b are fully immersed in the transparent dispersion medium c, and each can move freely in the transparent dispersion medium c. When an electric field is formed by electrodes at both ends of the micro-liquid capsule e, the white particle a with a positive polarity and the black particle b with a negative polarity each move accordingly under the force of the electric field. Each micro-liquid capsule e displays a certain degree of black or white color on one side of each micro-liquid capsule e close to the opposite substrate 10*d*. At the end, images are formed by all the micro-liquid capsules e on one side of the opposite substrate 10*d*.

Figure 4:
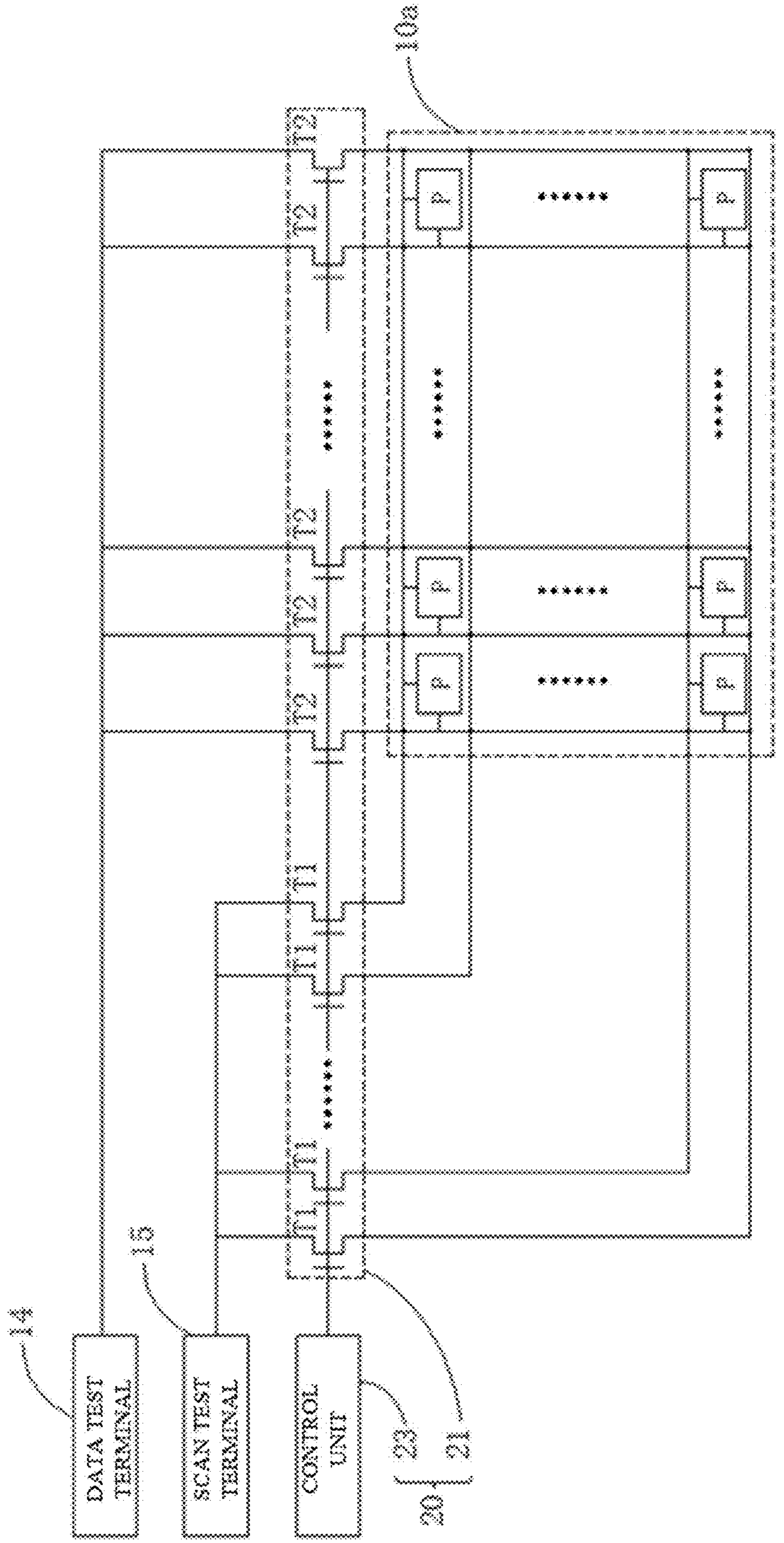
FIG. 4 is a schematic structural view of a fault detection circuit provided in embodiments of the disclosure.

Reference is made to FIG. 4, which is a schematic structural view of a fault detection circuit provided in embodiments of the disclosure. As illustrated in FIG. 4, a fault detection circuit 20 is arranged on the non-display region 10*b* of the display panel 10. The fault detection circuit 20 includes a first detection unit 21 and a control unit 23. The control unit 23 is connected to the first detection unit 21, and the first detection unit 21 is connected to a data test terminal 14, a scan test terminal 15, m data lines $S_1$~$S_m$, and n scan lines $G_1$~$G_n$. The first detection unit 21 is configured to receive a first control signal from the control unit 23, and under the control of the first control signal, electrically connect the m data lines $S_1$~$S_m$ to the n scan lines $G_1$~$G_n$ at intersections. The first detection unit 21 is configured to receive a test data signal from the data test terminal 14 and receive a test scan signal from the scan test terminal 15. The pixel units P in the display panel 10 display images according to the test scan signal and test data signal. According to an image display result, whether an open circuit or a short circuit occurs in one row or multiple rows of scan lines or data lines can be determined. The data test terminal 14 and the scan test terminal 15 are connected to an external signal output unit, and are configured to receive the test data signal and the test scan signal from the external signal output unit and transmit the test data signal and the test scan signal to the pixel units P.

The first detection unit 21 is configured to perform a short-circuit detection or an open-circuit detection on the pixel units in the display region 10*a* under the control of the control unit 23. If at least one pixel unit P displays abnormally and is determined as a first abnormal pixel unit, the control unit 23 is configured to control the second detection unit 22 to re-execute the detection. If the second detection unit 22 detects that the first abnormal pixel unit displays normally, the first detection unit 21 is determined to be faulty. If the second detection unit 22 detects that the first abnormal pixel unit displays abnormally, the first abnormal pixel unit is determined to be faulty. A pixel unit that displays abnormally during the detection by the second detection unit 22 is determined as a second abnormal pixel unit. If the first abnormal pixel unit is different from the second abnormal pixel unit detected by the second detection unit 22, the first detection unit 21 and the second abnormal pixel unit are determined to be faulty.

During the detection, if the color displayed by one row of pixel units P is significantly different from the color displayed by adjacent pixel units P, a scan line G controlling the image display of the row of pixel units P is determined to be faulty. If the color displayed by one column of pixel units P is significantly different from the color displayed by adjacent pixel units P, a data line S controlling the image display of the column of pixel units P is determined to be faulty. For example, if one row of pixel units P displays pure white and adjacent rows of pixel units P display black, a scan line G corresponding to the row of pixel units P is determined to have an open circuit or a short circuit. If one column of pixel units P displays pure white and adjacent columns of pixel units P display black, a data line S corresponding to the column of pixel units P is determined to have an open circuit or a short circuit.

In an embodiment, the control unit 23 may be a processor or a controller (for example, a central processing unit (CPU)), a general-purpose processor, a digital signal processor (DSP), an application specific integrated circuit (ASIC), a field programmable gate array (FPGA), or other programmable logic devices, transistor logic devices, hardware components, or any combination thereof. Various exemplary logical blocks, modules, and circuits described in conjunction with the disclosure may be achieved or implemented. The processor may also be a combination of computing functions, for example, a combination of one or more microprocessors, a combination of the DSP and the microprocessor, and the like.

In an embodiment, the first detection unit 21 includes multiple first switch transistors T1 and multiple second switch transistors T2. Gates of the multiple first switch transistors T1 are connected to the control unit 23, sources of the multiple first switch transistors T1 are connected to the scan test terminal 15, and drains of the multiple first switch transistors T1 are connected to the multiple scan lines G in the display panel 10, respectively. The multiple first switch transistors T1 are configured to, based on the first control signal output by the control unit 23, be turned on, and transmit the test scan signal output from the scan test terminal 15 to the pixel units P in the display panel 10.

Gates of the multiple second switch transistors T2 are connected to the control unit 23, sources of the multiple second switch transistors T2 are connected to the data test terminal 14, and drains of the multiple second switch transistors T2 are connected to the multiple data lines S in the display panel 10, respectively. The multiple second switch transistors T2 are configured to, based on the second control signal output by the control unit 23, be turned on, and transmit the test data signal output from the data test terminal 14 to the pixel units P in the display panel 10. The pixel units P perform image display according to the received test data signal and the received test scan signal. The first detection unit 21 includes n first switch transistors T1 and m second switch transistors T2. The n first switch transistors T1 are respectively connected to the n scan lines $G_1$~$G_n$, and the m second switch transistors T2 are respectively connected to the m data lines $S_1$~$S_m$.

Figure 5:
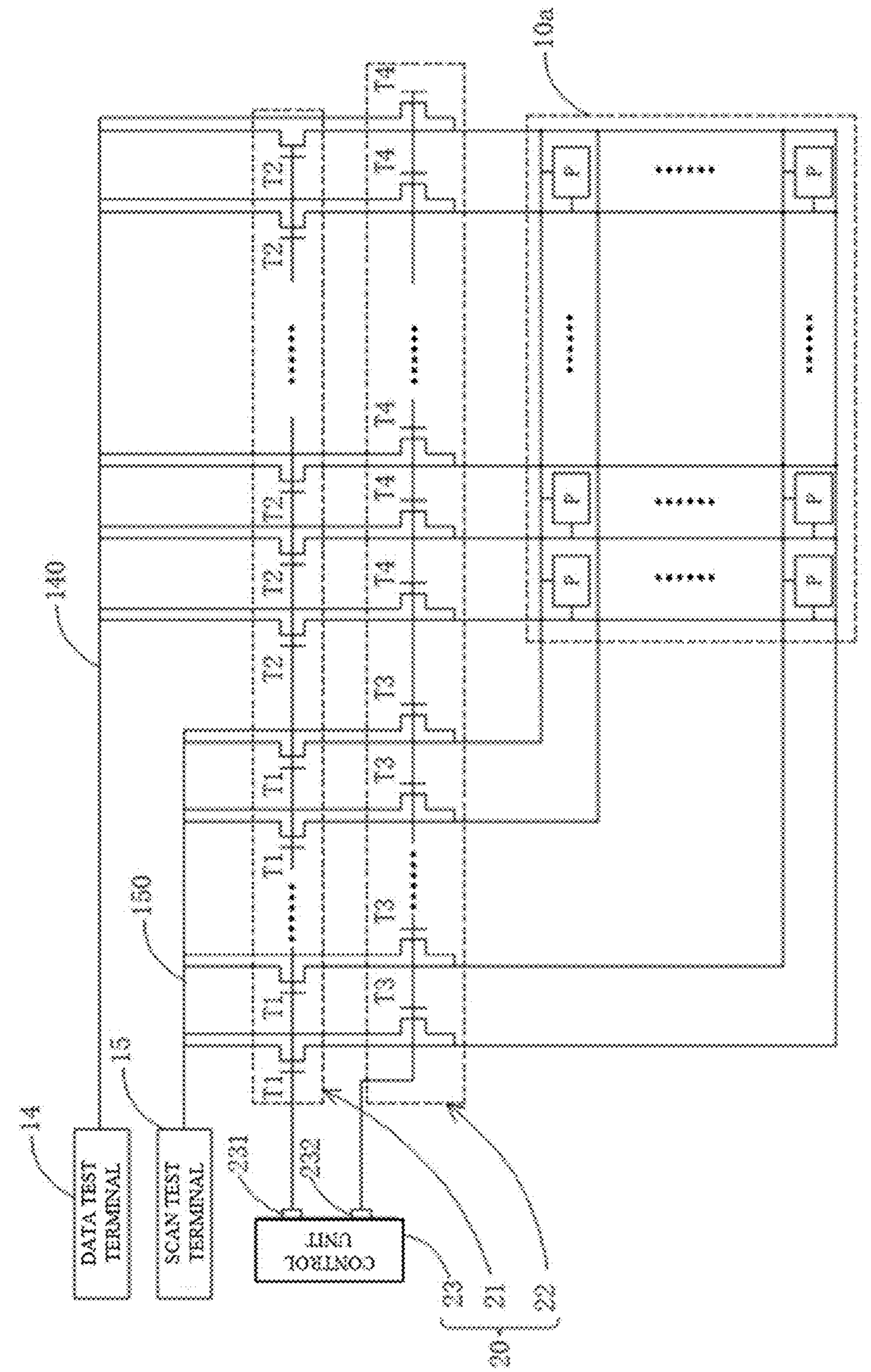
FIG. 5 is a schematic structural view of a fault detection circuit provided in embodiments of the disclosure.

Reference is made to FIG. 5, which is a schematic structural view of a fault detection circuit provided in embodiments of the disclosure. As illustrated in FIG. 5, the display panel 10 further includes a data test terminal 14 and a scan test terminal 15. The fault detection circuit 20 includes a first detection unit 21, a second detection unit 22, and a control unit 23. The control unit 23 is connected to the first detection unit 21 and the second detection unit 22, and is configured to control the first detection unit 21 or the second detection unit 22 to perform fault detection on the pixel units P in the display region 10*a*.

The first detection unit 21 is connected to a first-control-signal output terminal 231 of the control unit 23, m data lines $S_1$~$S_m$, and n scan lines $G_1$~$G_n$. The first detection unit 21 is connected to the data test terminal 14 via a data signal line 140, and connected to the scan test terminal 15 via a scan signal line 150. The first detection unit 21 is configured to receive a first control signal from the first-control-signal output terminal 231, and under the control of the first control signal, electrically connect the m data lines $S_1$~$S_m$ to the n scan lines $G_1$~$G_n$ at intersections. The first detection unit 21 is configured to receive a test data signal from the data test terminal 14 and receive a test scan signal from the scan test terminal 15. The pixel units Pin the display panel 10 display images according to the test scan signal and test data signal. According to an image display result, whether an open circuit or a short circuit occurs in one row or multiple rows of scan lines or data lines can be determined. The data test terminal 14 and the scan test terminal 15 are connected to an external signal output unit, and are configured to receive the test data signal and the test scan signal from the external signal output unit and transmit the test data signal and the test scan signal to the pixel units P.

The second detection unit 22 is connected to a second-control-signal output terminal 232 of the control unit 23, the m data lines $S_1$~$S_m$, and the n scan lines $G_1$~$G_n$. The second detection unit 22 is connected to the data test terminal 14 via the data signal line 140, and connected to the scan test terminal 15 via the scan signal line 150. The second detection unit 22 is configured to receive a second control signal from the second-control-signal output terminal 232, and under the control of the second control signal, electrically connect the m data lines $S_1$~$S_m$ to the n scan lines $G_1$~$G_n$ at intersections. The second detection unit 22 is configured to receive the test data signal from the data test terminal 14 and receive the test scan signal from the scan test terminal 15. The pixel units P in the display panel 10 display images according to the test scan signal and test data signal. According to the image display result, whether an open-circuit or a short-circuit occurs in one row or multiple rows of scan lines or data lines can be determined.

If the color displayed by one row of pixel units P is significantly different from the color displayed by adjacent pixel units P, a scan line G controlling the image display of the row of pixel units P is determined to be faulty. If the color displayed by one column of pixel units P is significantly different from the color displayed by adjacent pixel units P, a data line S controlling the image display of the column of pixel units P is determined to be faulty. For example, if one row of pixel units P displays pure white and adjacent rows of pixel units P display black, a scan line G corresponding to the row of pixel units P is determined to have an open circuit or a short circuit. If one column of pixel units P displays pure white and adjacent columns of pixel units P display black, a data line S corresponding to the column of pixel units P is determined to have an open circuit or a short circuit.

If both the first detection unit 21 and the second detection unit 22 detect that the display panel 10 is normal, the display panel 10 is determined to have no open circuit or short circuit. If the both the first detection unit 21 and the second detection unit 22 detect that the display panel 10 has anomalies in the same row or column of pixel units P, the display panel 10 is determined to have an open circuit or a short circuit.

If the first detection unit 21 detects that the display panel 10 is abnormal and the second detection unit 22 detects that the display panel 10 is normal, the first detection unit 21 is determined to be faulty and the display panel 10 is determined to be not faulty.

If the first detection unit 21 detects that the display panel 10 is abnormal and the second detection unit 22 detects that the display panel 10 is abnormal, but the pixel units P determined to be abnormal by the first detection unit 21 and the pixel units P determined to be abnormal by the second detection unit 22 are located at different rows or different columns, both the display panel 10 and the first detection unit 21 are determined to be faulty.

By using the first detection unit 21 and the second detection unit 22 to respectively perform fault detection on the pixel units P in the display panel 10, the quality of fault detection on the display panel 10 can be effectively improved. Further, the second detection unit 22 is controlled to re-execute the detection on the abnormal pixel unit, thereby effectively reducing the waste of material caused by wrong detection on the display panel 10 by a faulty first detection unit 21, and reducing the manufacturing cost of the display panel 10.

In an embodiment, the first detection unit 21 includes multiple first switch transistors T1 and multiple second switch transistors T2. Gates of the multiple first switch transistors T1 are connected to the first-control-signal output terminal 231, sources of the multiple first switch transistors T1 are connected to the scan test terminal 15 via the scan signal line 150, and drains of the multiple first switch transistors T1 are connected to the multiple scan lines G in the display panel 10, respectively. The multiple first switch transistors T1 are configured to, based on the first control signal output by the control unit 23, be turned on, and transmit the test scan signal output from the scan test terminal 15 to the pixel units P in the display panel 10.

Gates of the multiple second switch transistors T2 are connected to the first-control-signal output terminal 231, sources of the multiple second switch transistors T2 are connected to the data test terminal 14 via the data signal line 140, and drains of the multiple second switch transistors T2 are connected to the multiple data lines S in the display panel 10, respectively. The multiple second switch transistors T2 are configured to, based on the second control signal output by the control unit 23, be turned on, and transmit the test data signal output from the data test terminal 14 to the pixel units P in the display panel 10. The pixel units P perform image display according to the received test data signal and the received test scan signal. The first detection unit 21 includes n first switch transistors T1 and m second switch transistors T2. The n first switch transistors T1 are respectively connected to the n scan lines $G_1$~$G_n$, and the m second switch transistors T2 are respectively connected to the m data lines $S_1$~$S_m$.

The second detection unit 22 includes multiple third switch transistors T3 and multiple fourth switch transistors T4. Gates of the multiple third switch transistors T3 are connected to the second-control-signal output terminal 232, sources of the multiple third switch transistors T3 are connected to the scan test terminal 15 via the scan signal line 150, and drains of the multiple third switch transistors T3 are connected to the multiple scan lines G in the display panel 10, respectively. The third switch transistor T3 is configured to, based on the second control signal output by the control unit 23, be turned on, and transmit the test scan signal output from the scan test terminal 15 to the pixel units P in the display panel 10.

Gates of the multiple fourth switch transistors T4 are connected to the second-control-signal output terminal 232, sources of the multiple fourth switch transistors T4 are connected to the data test terminal 14 via the data signal line 140, and drains of the multiple fourth switch transistors T4 are connected to the multiple data lines S in the display panel 10, respectively. The fourth switch transistor T4 is configured to, based on the second control signal output by the control unit 23, be turned on, and transmit the test data signal output from the data test terminal 14 to the pixel units P in the display panel 10. The pixel units P perform image display according to the received test data signal and the received test scan signal.

The second detection unit 22 includes n third switch transistors T3 and m fourth switch transistors T4. The n third switch transistors T3 are respectively connected to the n scan lines $G_1$~$G_n$, and the m fourth switch transistors T4 are respectively connected to the m data lines $S_1$~$S_m$.

Figure 6:
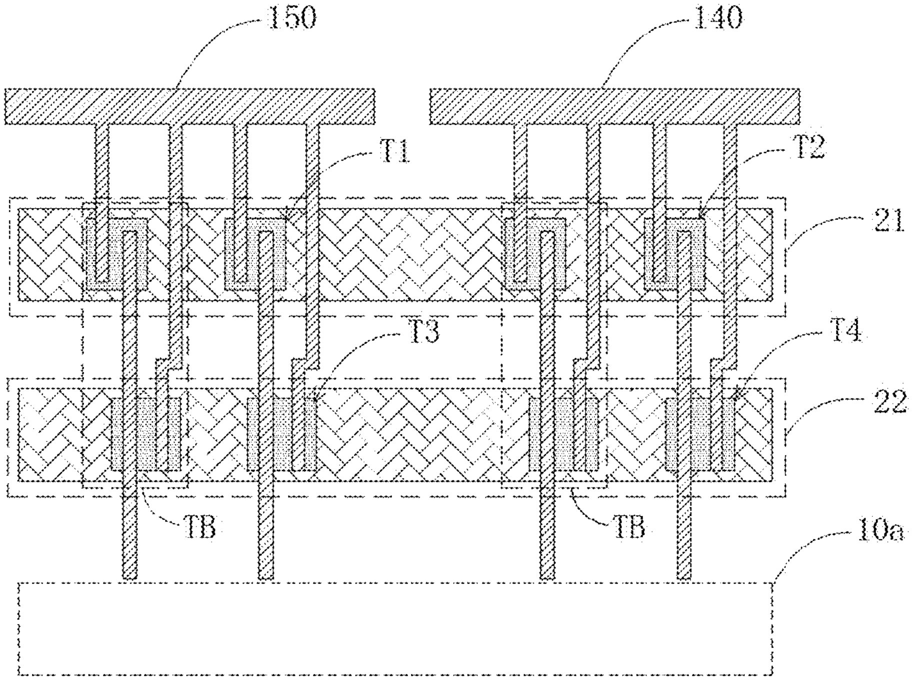
FIG. 6 is a schematic planar layout diagram of the fault detection circuit in FIG. 5.

Reference is made to FIG. 6, which is a schematic planar layout diagram of the fault detection circuit in FIG. 5.

As illustrated in FIG. 6, the first detection unit 21 and the second detection unit 22 are adjacent to each other and arranged at the same side of the display region 10*a*. In the first detection unit 21, the n first switch transistors T1 are arranged in sequence in the first direction F1, and are each connected to the control unit 23, and are respectively connected to the scan signal lines 150 and respectively connected to the n scan lines $G_1$~$G_n$. The m second switch transistors T2 are arranged in sequence in the first direction F1, and the m second switch transistors T2 and the n first switch transistors T1 are arranged at the same row. The m second switch transistors T2 are each connected to the control unit 23, and are respectively connected to the data signal lines 140 and respectively connected to the m data lines $S_1$~$S_m$.

The n third switch transistors T3 in the second detection unit 22 are spaced apart from the n first switch transistors T1 by a preset distance in a second direction F2, and the n third switch transistors T3 and the n first switch transistors T1 are sequentially arranged in a one-to-one correspondence. The n third switch transistors T3 are each connected to the control unit 23, and are respectively connected to the scan signal lines 150 and respectively connected to the n scan lines $G_1$~$G_n$. The m fourth switch transistors T4 in the second detection unit 22 are spaced apart from the m second switch transistors T2 by a preset distance in a second direction F2, and the m fourth switch transistors T4 and the n third switch transistors T3 are sequentially arranged in a one-to-one correspondence. The m fourth switch transistors T4 and the n third switch transistors T3 are arranged at the same row, and the m fourth switch transistors T4 are each connected to the control unit 23, and are respectively connected to the data signal lines 140 and respectively connected to the m data lines $S_1$~$S_m$.

For the first switch transistors T1 and the third switch transistors T3 that are spaced apart from one another by a preset distance and are sequentially arranged in a one-to-one correspondence, one first switch transistor T1 and one third switch transistor T3 are considered as a switch transistor group TB. The source of the first switch transistor T1 and the source of the third switch transistor T3 in the switch transistor group TB are connected to the scan driving circuit 13 via the same scan signal line 150. The drain of the first switch transistor T1 and the drain of the third switch transistor T3 are connected to the same scan line, and are configured to asynchronously receive the test scan signal from the scan driving circuit 13 and transmit the test scan signal to the pixel units P. That is, when the control unit 23 outputs the first control signal to the first switch transistor T1, the first switch transistor T1 is turned on and transmits the test scan signal. When the control unit 23 outputs the second control signal to the third switch transistor T3, the third switch transistor T3 is turned on and transmits the test scan signal.

For the second switch transistors T2 and the fourth switch transistors T4 that are spaced apart from one another by a preset distance and are sequentially arranged in a one-to-one correspondence, one second switch transistor T2 and one fourth switch transistor T4 are considered as a switch transistor group TB. The source of the second switch transistor T2 and the source of the fourth switch transistor T4 in the switch transistor group TB are connected to the data driving circuit 12 via the same data signal line 140. The drain of the second switch transistor T2 and the drain of the fourth switch transistor T4 are connected to the same data line, and are configured to asynchronously receive the test data signal and transmit the test data signal to the pixel units P. That is, when the control unit 23 outputs the first control signal to the second switch transistor T2, the second switch transistor T2 is turned on and transmits the test data signal. When the control unit 23 outputs the second control signal to the fourth switch transistor T4, the fourth switch transistor T4 is turned on and transmits the test data signal.

Figure 7:
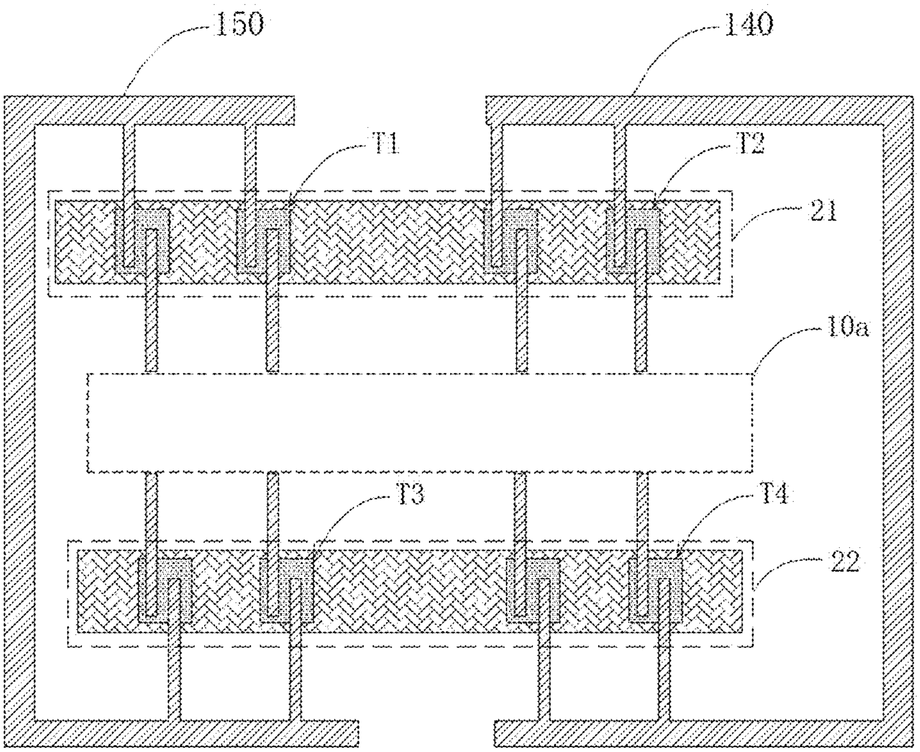
FIG. 7 is a schematic planar layout diagram of a fault detection circuit provided in embodiments of the disclosure.

Reference is made to FIG. 7, which is a schematic planar layout diagram of a fault detection circuit provided in embodiments of the disclosure. As illustrated in FIG. 7, the first detection unit 21 and the second detection unit 22 are arranged opposite to each other and at different sides of the display region 10*a*. In the first detection unit 21, the n first switch transistors T1 are arranged in sequence in the first direction F1, and are each connected to the control unit 23, and are respectively connected to the scan signal lines 150 and respectively connected to the n scan lines $G_1$~$G_n$. The m second switch transistors T2 are arranged in sequence in the first direction F1, and the m second switch transistors T2 and the n first switch transistors T1 are arranged at the same row. The m second switch transistors T2 are each connected to the control unit 23, and are respectively connected to the data signal lines 140 and respectively connected to the m data lines $S_1$~$S_m$.

Figure 8:
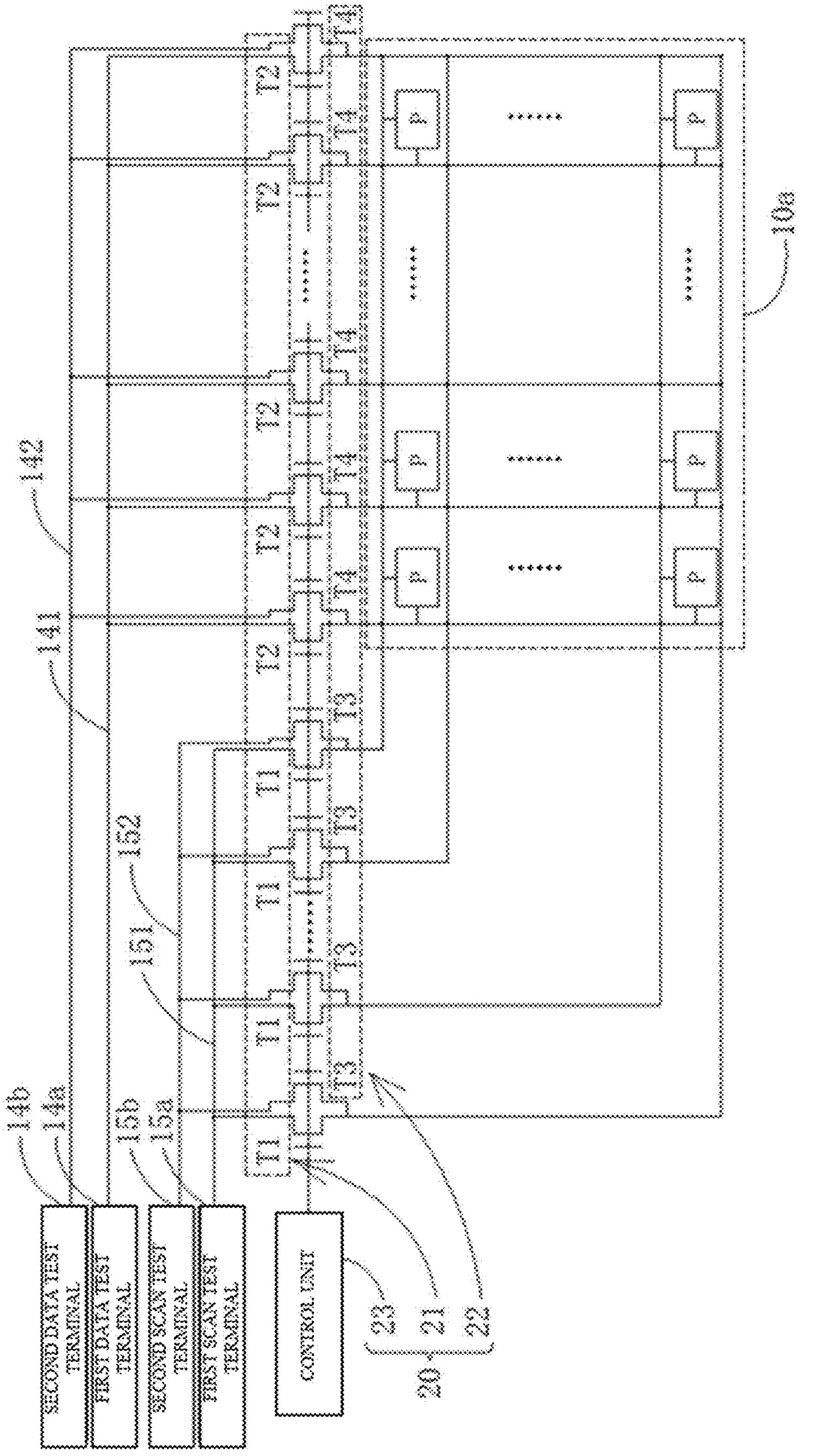
FIG. 8 is a schematic structural view of a fault detection circuit provided in embodiments of the disclosure.

Reference is made to FIG. 8, which is a schematic structural view of a fault detection circuit provided in embodiments of the disclosure. As illustrated in FIG. 8, the display panel 10 further includes a first data test terminal 14*a*, a second data test terminal 14*b*, a first scan test terminal 15*a*, and a second scan test terminal 15*b*. The fault detection circuit 20 includes a first detection unit 21, a second detection unit 22, and a control unit 23. The control unit 23 is connected to the first detection unit 21 and the second detection unit 22, and the control unit 23 is configured to control the first detection unit 21 or the second detection unit 22 to perform fault detection on the pixel units P in the display region 10*a*.

In an embodiment, the first detection unit 21 is connected to the first data test terminal 14*a* via a first data signal line 141 and connected to the first scan test terminal 15*a* via a first scan signal line 151. The first detection unit 21 is connected to m data lines $S_1$~$S_m$ and n scan lines $G_1$~$G_n$. The first detection unit 21 is configured to receive a control signal from the control unit 23, and under the control of the control signal, electrically connect the m data lines $S_1$~$S_m$ to the n scan lines $G_1$~$G_n$ at intersections. The first detection unit 21 is configured to receive a first test data signal from the first data test terminal 14*a* and receive a first test scan signal from the first scan test terminal 15*a*. The pixel units P in the display panel 10 display images according to the first test scan signal and first test data signal. According to an image display result, whether an open circuit or a short circuit occurs in one row or multiple rows of scan lines or data lines can be determined. The first data test terminal 14*a*, the second data test terminal 14*b*, the first scan test terminal 15*a*, and the second scan test terminal 15*b* are configured to connect to an external signal output unit, and are configured to receive the first test data signal, the second test data signal, the first test scan signal, and the second test scan signal from the external signal output unit and transmit the first test data signal, the second test data signal, the first test scan signal, and the second test scan signal to the pixel units P.

The second detection unit 22 is connected to the second data test terminal 14*b* via a second data signal line 142 and connected to the second scan test terminal 15*b* via a second scan signal line 152. The second detection unit 22 is connected to the m data lines $S_1$~$S_m$ and the n scan lines $G_1$~$G_n$. The second detection unit 22 is configured to receive the control signal from the control unit 23, and under the control of the control signal, electrically connect the m data lines $S_1$~$S_m$ to the n scan lines $G_1$~$G_n$ at intersections. The second detection unit 22 is configured to receive the second test data signal from the second data test terminal 14*b* and receive the second test scan signal from the second scan test terminal 15*b*. The pixel units P in the display panel 10 display images according to the second test scan signal and second test data signal. According to the image display result, whether an open circuit or a short circuit occurs in one row or multiple rows of scan lines or data lines can be determined.

In an embodiment, the first detection unit 21 includes multiple first switch transistors T1 and multiple second switch transistors T2. Gates of the multiple first switch transistors T1 are connected to the control unit 23, sources of the multiple first switch transistors T1 are connected to the first scan test terminal 15*a* via the first scan signal line 151, and drains of the multiple first switch transistors T1 are connected to the multiple scan lines G in the display panel 10, respectively. The multiple first switch transistors T1 are configured to, based on the control signal output by the control unit 23, be turned on, and transmit the first test scan signal to the pixel units P in the display panel 10.

Gates of the multiple second switch transistors T2 are connected to the control unit 23, sources of the multiple second switch transistors T2 are connected to the first data test terminal 14*a* via the first data signal line 141, and drains of the multiple second switch transistors T2 are connected to the multiple data lines S in the display panel 10, respectively. The multiple second switch transistors T2 are configured to, based on the control signal output by the control unit 23, be turned on, and transmit the first test data signal to the pixel units P in the display panel 10. The pixel units P perform image display according to the received first test data signal and received the first test scan signal. The first detection unit 21 includes n first switch transistors T1 and m second switch transistors T2. The n first switch transistors T1 are respectively connected to the n scan lines $G_1$~$G_n$, and the m second switch transistors T2 are respectively connected to the m data lines $S_1$~$S_m$.

The second detection unit 22 includes multiple third switch transistors T3 and multiple fourth switch transistors T4. Gates of the multiple third switch transistors T3 are connected to the control unit 23, sources of the multiple third switch transistors T3 are connected to the second scan test terminal 15*b* via the second scan signal line 152, and drains of the multiple third switch transistor T3 are connected to the multiple scan lines G in the display panel 10, respectively. The third switch transistor T3 is configured to, based on the control signal output by the control unit 23, be turned on, and transmit the output second test scan signal to the pixel units P in the display panel 10.

Gates of the multiple fourth switch transistors T4 are connected to the control unit 23, sources of the multiple fourth switch transistors T4 are connected to the second data test terminal 14*b* via the second data signal line 142, and drains of the multiple fourth switch transistors T4 are connected to the multiple data lines S in the display panel 10. The fourth switch transistor T4 is configured to, based on the control signal output by the control unit 23, be turned on, and transmit the second test data signal to the pixel units P in the display panel 10. The pixel units P perform image display according to the received second test data signal and the received second test scan signal.

The second detection unit 22 includes n third switch transistors T3 and m fourth switch transistors T4. The n third switch transistors T3 are respectively connected to the n scan lines $G_1$~$G_n$, and the m fourth switch transistors T4 are respectively connected to the m data lines $S_1$~$S_m$.

Figure 9:
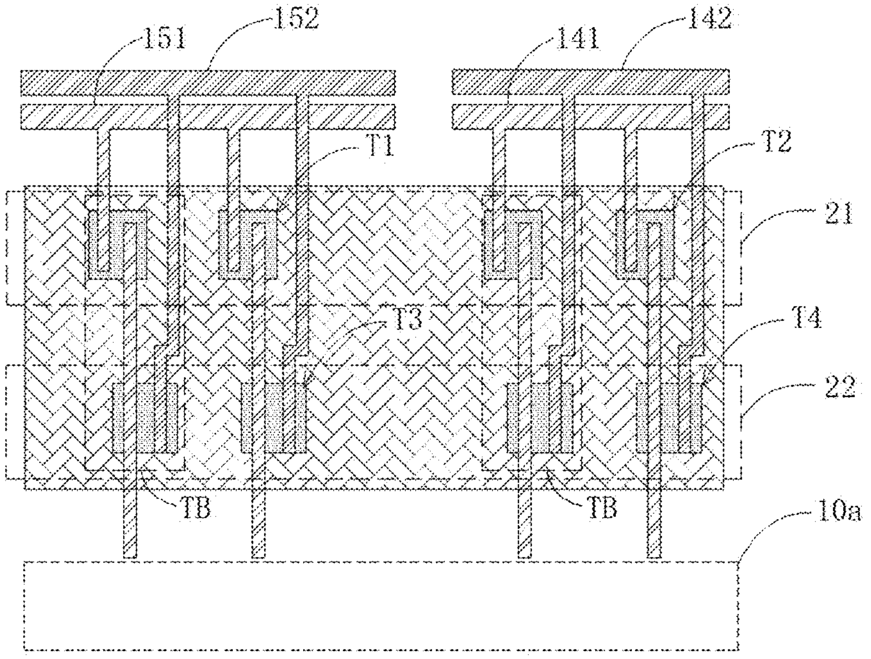
FIG. 9 is a schematic planar layout diagram the fault detection circuit in FIG. 8.

Reference is made to FIG. 9, which is a layout schematic diagram of the fault detection circuit shown in FIG. 8.

As illustrated in FIG. 9, the first detection unit 21 and the second detection unit 22 are adjacent to each other and arranged at the same side of the display region 10*a*. In the first detection unit 21, the n first switch transistors T1 are arranged in sequence in the first direction F1, and are each connected to the control unit 23, and are respectively connected to the scan signal lines 150 and respectively connected to the n scan lines $G_1$~$G_n$. The m second switch transistors T2 are arranged in sequence in the first direction F1, and the m second switch transistors T2 and the n first switch transistors T1 are arranged at the same row. The m second switch transistors T2 are each connected to the control unit 23, and are respectively connected to the first data signal lines 141 and respectively connected to the m data lines $S_1$~$S_m$. The gate of the first switch transistor T1 and the gate of the second switch transistor T2 are connected to the same line.

The n third switch transistors T3 in the second detection unit 22 are spaced apart from the n first switch transistors T1 by a preset distance in a second direction F2, and the n third switch transistors T3 and the n first switch transistors T1 are sequentially arranged in a one-to-one correspondence. The n third switch transistors T3 are each connected to the control unit 23, and are respectively connected to the second scan signal lines 152 and respectively connected to the n scan lines $G_1$~$G_n$. The m fourth switch transistors T4 are spaced apart from the m second switch transistors T2 by a preset distance in a second direction F2, and the m fourth switch transistors T4 and the n third switch transistors T3 are arranged in a one-to-one correspondence. The m fourth switch transistors T4 and the n third switch transistors T3 are arranged at the same row, and the m fourth switch transistors T4 are each connected to the control unit 23, and are respectively connected to the second data signal lines 142 and respectively connected to the m data lines $S_1$~$S_m$.

For the first switch transistors T1 and the third switch transistors T3 that are spaced apart from one another by a preset distance and are sequentially arranged in a one-to-one correspondence, one first switch transistor T1 and one third switch transistor T3 are considered as a switch transistor group TB. The source of the first switch transistor T1 and the source of the third switch transistor T3 in the switch transistor group TB are connected to the scan driving circuit 13 via the first scan signal line 151 and the second scan signal line 152. The drain of the first switch transistor T1 and the drain of the third switch transistor T3 are connected to the same scan line, and are configured to asynchronously receive the test scan signal from the scan driving circuit 13 and transmit the test scan signal to the pixel units P. That is, when the control unit 23 outputs the first control signal to the first switch transistor T1, the first switch transistor T1 is turned on, receives the test scan signal from the first scan 151, and transmits the test scan signal to the pixel units P. When the control unit 23 outputs the second control signal to the third switch transistor T3, the third switch transistor T3 is turned on, receives the test scan signal from the second scan signal line 152, and transmits the test scan signal to the pixel units P.

For the second switch transistors T2 and the fourth switch transistors T4 that are spaced apart from one another by a preset distance and are sequentially arranged in a one-to-one correspondence, one second switch transistor T2 and one fourth switch transistor T4 are considered as a switch transistor group TB. The source of the second switch transistor T2 and the source of the fourth switch transistor T4 in the switch transistor group TB are connected to the data driving circuit 12 via the first data signal line 141 and the second data signal line 142. The drain of the second switch transistor T2 and the drain of the fourth switch transistor T4 are connected to the same data line, and are configured to asynchronously receive the test data signal and transmit the test data signal to the pixel units P. That is, when the control unit 23 outputs the first control signal to the second switch transistor T2, the second switch transistor T2 is turned on, receives the test data signal from the first data signal line 141, and transmits the test data signal to the pixel units P. When the control unit 23 outputs the second control signal to the fourth switch transistor T4, the fourth switch transistor T4 is turned on, receives the test data signal from the second data signal line 142, and transmits the test data signal to the pixel units P.

Figure 10:
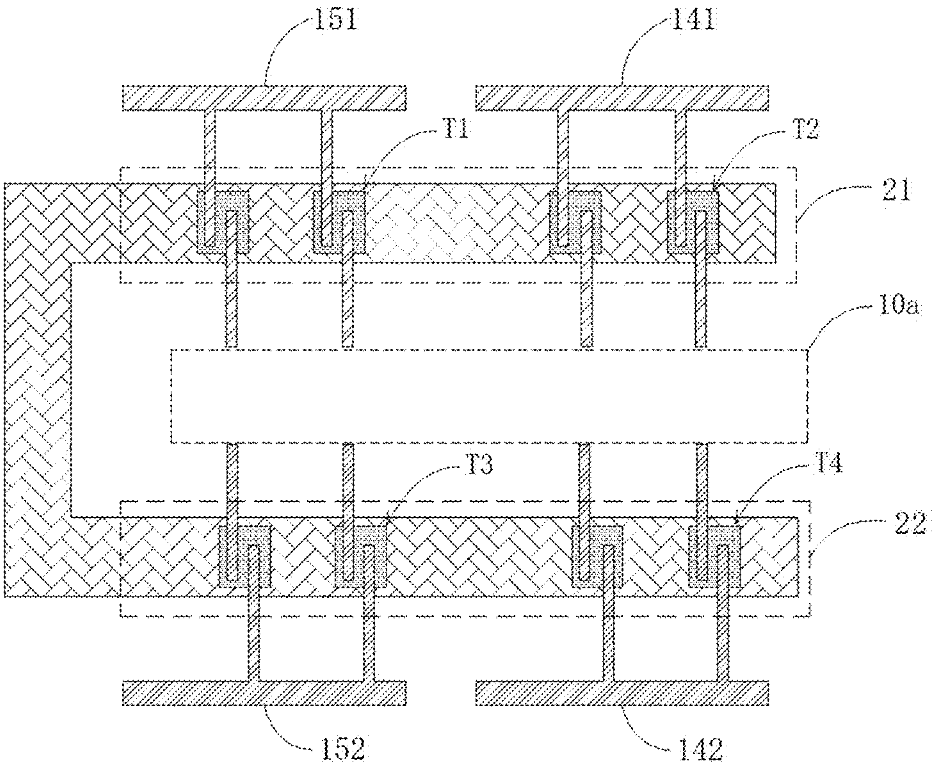
FIG. 10 is a schematic planar layout diagram of a fault detection circuit provided in embodiments of the disclosure.

Reference is made to FIG. 10, which is a schematic planar layout diagram of a fault detection circuit provided in embodiments of the disclosure. As illustrated in FIG. 10, the first detection unit 21 and the second detection unit 22 are arranged opposite to each other and at different sides of the display region 10*a*. In the first detection unit 21, the n first switch transistors T1 are arranged in sequence in the first direction F1, and are each connected to the control unit 23, and are respectively connected to the first scan signal lines 151 and respectively connected to the n scan lines $G_1$~$G_n$. The m second switch transistors T2 are arranged in sequence in the first direction F1, and the m second switch transistors T2 and the n first switch transistors T1 are arranged at the same row. The m second switch transistors T2 are each connected to the control unit 23, and are respectively connected to the first data signal lines 141 and respectively connected to the m data lines $S_1$~$S_m$.

In the second detection unit 22, the n third switch transistors T3 are arranged in sequence in the first direction F1, and are each connected to the control unit 23, and are respectively connected to the second scan signal lines 152 and respectively connected to the n scan lines $G_1$~$G_n$. The m fourth switch transistors T4 are arranged in sequence in the first direction F1, and the m fourth switch transistors T4 and the n third switch transistors T3 are arranged at the same row. The m fourth switch transistors T4 are each connected to the control unit 23, and are respectively connected to the second data signal lines 142 and respectively connected to the m data lines $S_1$~$S_m$.

Figure 11:
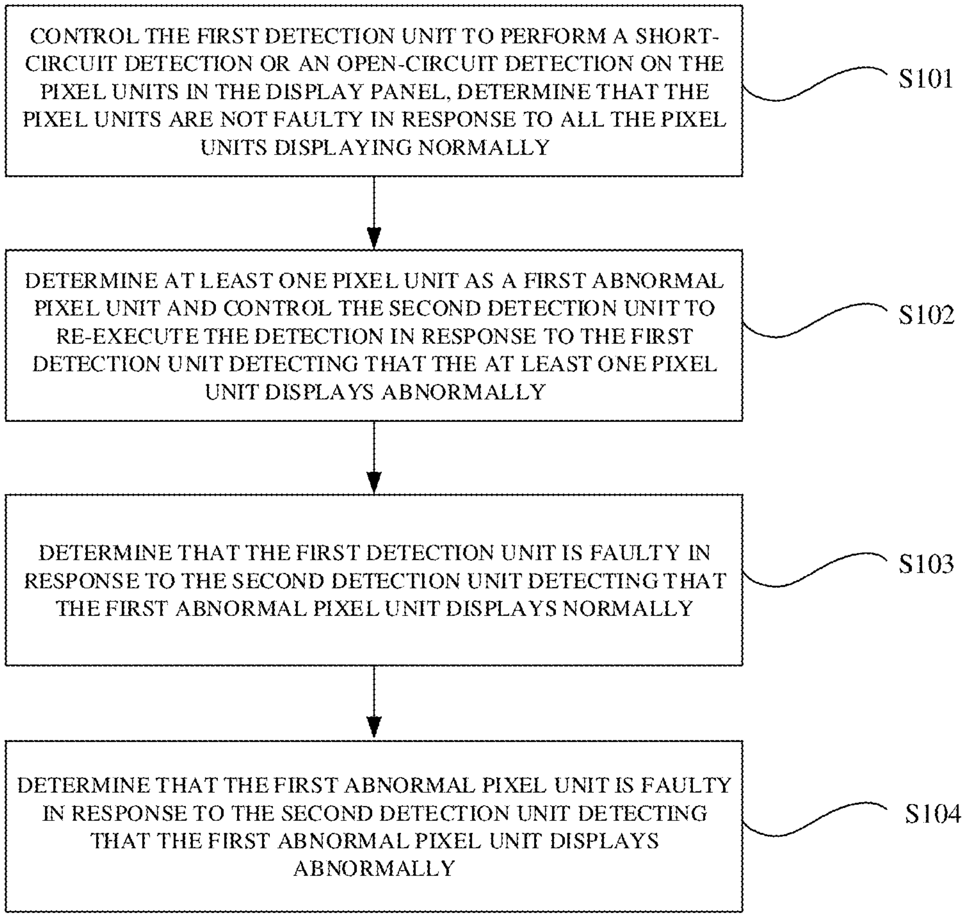
FIG. 11 is a flow chart of a method for fault detection provided in embodiments of the disclosure.

Reference is made to FIG. 11, which is a flow chart of a method for fault detection provided in embodiment 7 of the disclosure. As illustrated in FIG. 11, the fault detection circuit 20 is configured to perform a short-circuit detection or an open-circuit detection on the display panel 10. Specific operations are as follows.

At S101, the first detection unit is controlled to perform a short-circuit detection or an open-circuit detection on the pixel units in the display panel, and if all the pixel units display normally, the pixel units are determined to be not faulty.

The control unit 23 outputs the first control signal to the first detection unit 21, and the first detection unit 21 turns on all the first switch transistors T1 and all the second switch transistors T2 according to the first control signal. In this way, the scan test terminal 15 is connected to the n scan lines $G_1$~$G_n$ via the n first switch transistors T1, the data test terminal 14 is connected to the m data lines $S_1$~$S_m$ via the m second switch transistors T2, and the n scan lines $G_1$~$G_n$ and the m data lines $S_1$~$S_m$ are short-circuited to one another in the display region 10*a*.

The scan test terminal 15 outputs the test scan signal to the pixel units P via the multiple first switch transistors T1, and the data test terminal 14 outputs the test data signal to the pixel units P via the multiple second switch transistors T2. If the display panel 10 displays a pure-colored image (completely black or completely white), the pixel units P in the display panel 10 are determined to have no short circuit or open circuit.

At S102, if the first detection unit detects that at least one pixel unit displays abnormally, the at least one pixel unit is determined as a first abnormal pixel unit, and the second detection unit is controlled to re-execute the detection.

If the display panel 10 displays a white stripe or a black stripe, the pixel units P in the display panel 10 may be determined to be faulty.

At S103, if the second detection unit detects that the first abnormal pixel unit displays normally, the first detection unit is determined to be faulty.

If the first detection unit 21 detects the first abnormal pixel unit, i.e., detects that the display panel 10 is faulty, the control unit 23 outputs the second control signal to the second detection unit 22, and the second detection unit 22 turns on all the third switch transistors T3 and all the fourth switch transistors T4 according to the second control signal. In this way, the scan test terminal 15 is connected to the n scan lines $G_1$~$G_n$ via the n third switch transistors T3, the data test terminal 14 is connected to the m data lines $S_1$~$S_m$ via the m fourth switch transistors T4, and the n scan lines $G_1$~$G_n$ and the m data lines $S_1$~$S_m$ are short-circuited to one another in the display region 10*a*.

The scan test terminal 15 outputs the test scan signal to the pixel units P via the multiple third switch transistors T3, and the data test terminal 14 outputs the test data signal to the pixel units P via the multiple fourth switch transistors T4. If the display panel 10 displays a pure-colored image (completely black or completely white), the display panel 10 is determined to have no short circuit or open circuit, which means that the first detection unit 21 is faulty, and the pixel units P in the display panel 10 are not faulty. That is, the first abnormal pixel unit is not faulty.

At S104, if the second detection unit detects that the first abnormal pixel unit displays abnormally, the first abnormal pixel unit is determined to be faulty The second detection unit 22 controls the display panel 10 to display a white stripe or a black stripe. If the stripe position is the same as the stripe position appearing during the first detection of the display panel 10, the first abnormal pixel unit is determined to be faulty and the first detection unit 21 is determined to be not faulty.

A pixel unit that displays abnormally during the detection by the second detection unit 22 is determined as a second abnormal pixel unit. If the first abnormal pixel unit is different from the second abnormal pixel unit detected by the second detection unit 22, both the first detection unit 21 and the second abnormal pixel unit 22 are determined to be faulty. The second detection unit 22 controls the display panel 10 to display a white stripe or a black stripe. If the stripe position is different from the stripe position appearing during the first detection of the display panel 10, both the first detection unit 21 and the display panel 10 are determined to be faulty.

The second detection unit 22 re-execute the detection on the display panel 10 that has been detected by the first detection unit 21, which can effectively improve the quality of detection by the first detection unit 21. In this way, the waste of material caused by wrong detection on the display panel 10 by a faulty first detection unit can be addressed, thereby saving the material of the display panel 10.

It is to be understood that, the disclosure is not to be limited to the above embodiments. Those of ordinary skill in the art can make improvements or changes based on the above description, and all these improvements and changes should fall within the protection scope of the appended claims of this disclosure.

What is claimed is:

1. A fault detection circuit, applicable to a display panel comprising a plurality of pixel units for image display, and comprising a first detection unit, a second detection unit, and a control unit, wherein the control unit is connected to the first detection unit and the second detection unit; the first detection unit is configured to perform a short-circuit detection or an open-circuit detection on the plurality of pixel units in the display panel under control of the control unit; the control unit is configured to control the second detection unit to re-execute a detection in response to at least one pixel unit displaying abnormally and being determined as a first abnormal pixel unit; in response to the second detection unit detecting that the first abnormal pixel unit displays normally, the first detection unit is determined to be faulty; and in response to the second detection unit detecting that the first abnormal pixel unit displays abnormally, the first abnormal pixel unit is determined to be faulty.

2. The fault detection circuit of claim 1, wherein a pixel unit that displays abnormally during the detection by the second detection unit is determined as a second abnormal pixel unit; in response to the first abnormal pixel unit being different from the second abnormal pixel unit detected by the second detection unit, the first detection unit and the second abnormal pixel unit are determined to be faulty.

3. The fault detection circuit of claim 2, wherein the display panel comprises a scan test terminal, a data test terminal, a plurality of scan lines extending in a first direction, and a plurality of data lines extending in a second direction, wherein the first direction is different from the second direction; wherein the first detection unit is connected to a first-control-signal output terminal of the control unit, the scan test terminal, the data test terminal, the plurality of data lines, and the plurality of scan lines; the first detection unit is configured to receive a first control signal from the first-control-signal output terminal; and the first detection unit is configured to, based on the first control signal, receive a test scan signal from the scan test terminal and transmit the test scan signal to the plurality of pixel units and receive a test data signal from the data test terminal and transmit the test data signal to the plurality of pixel units, to control the plurality of pixel units to perform image display; and the second detection unit is connected to a second-control-signal output terminal of the control unit, the scan test terminal, the data test terminal, the plurality of data lines, and the plurality of scan lines; the second detection unit is configured to receive a second control signal from the second-control-signal output terminal; and the second detection unit is configured to, based on the second control signal, receive the test scan signal from the scan test terminal and transmit the test scan signal to the plurality of pixel units and receive the test data signal from the data test terminal and transmit the test data signal to the plurality of pixel units, to control the plurality of pixel units to perform image display.

4. The fault detection circuit of claim 3, wherein the first detection unit comprises a plurality of first switch transistors and a plurality of second switch transistors;

gates of the plurality of first switch transistors are connected to the first-control-signal output terminal, sources of the plurality of first switch transistors are connected to the scan test terminal, and drains of the plurality of first switch transistors are connected to the plurality of scan lines, respectively; and the plurality of first switch transistors are configured to, based on the first control signal, be turned on, receive the test scan signal from the scan test terminal, and transmit the test scan signal to the plurality of pixel units; and gates of the plurality of second switch transistors are connected to the first-control-signal output terminal, sources of the plurality of second switch transistors are connected to the data test terminal, and drains of the plurality of second switch transistors are connected to the plurality of data lines, respectively; and the plurality of second switch transistors are configured to, based on the first control signal, be turned on, receive the test data signal from the data test terminal, and transmit the test data signal to the plurality of pixel units.

5. The fault detection circuit of claim 4, wherein the second detection unit comprises a plurality of third switch transistors and a plurality of fourth switch transistors; gates of the plurality of third switch transistors are connected to the second-control-signal output terminal, sources of the plurality of third switch transistors are connected to the scan test terminal, and drains of the plurality of third switch transistors are connected to the plurality of scan lines, respectively; and the plurality of third switch transistors are configured to, based on the second control signal, be turned on, receive the test scan signal from the scan test terminal, and transmit the test scan signal to the plurality of pixel units; and gates of the plurality of fourth switch transistors are connected to the second-control-signal output terminal, sources of the plurality of fourth switch transistors are connected to the data test terminal, and drains of the plurality of fourth switch transistors are connected to the plurality of data lines, respectively; and the plurality of fourth switch transistors are configured to, based on the second control signal, be turned on, receive the test data signal from the data test terminal, and transmit the test data signal to the plurality of pixel units.

6. The fault detection circuit of claim 5, wherein the display panel comprises a display region and a non-display region adjacent to each other; the first detection unit and the second detection unit are adjacent to each other and arranged on the non-display region at a same side of the display region; the plurality of first switch transistors and the plurality of third switch transistors are arranged sequentially in a one-to-one correspondence; sources of any corresponding pair of a first switch transistor of the plurality of first switch transistors and a third switch transistor of the plurality of third switch transistors are connected to the scan test terminal, and drains of any corresponding pair of the first switch transistor and the third switch transistor are connected to a same scan line, to asynchronously transmit the test scan signal;

the plurality of second switch transistors and the plurality of fourth switch transistors are arranged sequentially in a one-to-one correspondence; sources of any corresponding pair of a second switch transistor of the plurality of second switch transistors and a fourth switch transistor of the plurality of fourth switch transistors are connected to the data test terminal, and drains of any corresponding pair of the second switch transistor and the fourth switch transistor are connected to a same data line, to asynchronously transmit the test data signal.

7. The fault detection circuit of claim 6, wherein the first detection unit and the second detection unit are arranged opposite to each other, and are respectively arranged on the non-display region at different sides of the display region.

8. The fault detection circuit of claim 2, wherein the display panel comprises a first data test terminal, a second data test terminal, a first scan test terminal, a second scan test terminal, a plurality of scan lines extending in a first direction, and a plurality of data lines extending in a second direction, wherein the first direction is different from the second direction; wherein the first detection unit is connected to the first scan test terminal, the first data test terminal, the plurality of data lines, and the plurality of scan lines; the first detection unit is configured to, based on a control signal output by the control unit, receive a first test scan signal from the first scan test terminal and transmit the first test scan signal to the plurality of pixel units and receive a first test data signal from the first data test terminal and transmit the first test data signal to the plurality of pixel units, to control the plurality of pixel units to perform image display; and the second detection unit is connected to the second scan test terminal, the second data test terminal, the plurality of data lines, and the plurality of scan lines; the second detection unit is configured to, based on the control signal, receive a second test scan signal from the second scan test terminal and transmit the second test scan signal to the plurality of pixel units and receive a second test data signal from the second data test terminal and transmit the second test data signal to the plurality of pixel units, to control the plurality of pixel units to perform image display.

9. The fault detection circuit of claim 1, wherein the plurality of pixel units each comprises a plurality of micro-liquid capsules, and the micro-liquid capsules each is a sealed sphere; white particles, black particles, and a transparent dispersion medium are encapsulated inside each of the plurality of micro-liquid capsules, wherein a white particle and a black particle carry different charges; and the white particles and the black particles are fully immersed in the transparent dispersion medium, and each move correspondingly in the transparent dispersion medium under action of an electric field.

10. A display panel, comprising a data driving circuit, a scan driving circuit, a plurality of pixel units arranged in an array, and a fault detection circuit, wherein the scan driving circuit is configured to output a scan signal to the plurality of pixel units, the data driving circuit is configured to output a data signal to the plurality of pixel units, the plurality of pixel units are configured to receive the data signal to perform image display under control of the scan signal, and the fault detection circuit is configured to perform a short-circuit detection or an open-circuit detection on the plurality of pixel units; and the fault detection circuit comprises a first detection unit, a second detection unit, and a control unit, wherein the control unit is connected to the first detection unit and the second detection unit; the first detection unit is configured to perform the short-circuit detection or the open-circuit detection on the plurality of pixel units under control of the control unit; the control unit is configured to control the second detection unit to re-execute a detection in response to at least one pixel unit displaying abnormally and being determined as a first abnormal pixel unit; in response to the second detection unit detecting that the first abnormal pixel unit displays normally, the first detection unit is determined to be faulty; and in response to the second detection unit detecting that the first abnormal pixel unit displays abnormally, the first abnormal pixel unit is determined to be faulty.

11. The display panel of claim 10, wherein a pixel unit that displays abnormally during the detection by the second detection unit is determined as a second abnormal pixel unit; in response to the first abnormal pixel unit being different from the second abnormal pixel unit detected by the second detection unit, the first detection unit and the second abnormal pixel unit are determined to be faulty.

12. The display panel of claim 11, wherein the display panel comprises a scan test terminal, a data test terminal, a plurality of scan lines extending in a first direction, and a plurality of data lines extending in a second direction, wherein the first direction is different from the second direction; wherein the first detection unit is connected to a first-control-signal output terminal of the control unit, the scan test terminal, the data test terminal, the plurality of data lines, and the plurality of scan lines; the first detection unit is configured to receive a first control signal from the first-control-signal output terminal; and the first detection unit is configured to, based on the first control signal, receive a test scan signal from the scan test terminal and transmit the test scan signal to the plurality of pixel units, and receive a test data signal from the data test terminal and transmit the test data signal to the plurality of pixel units, to control the plurality of pixel units to perform image display; and the second detection unit is connected to a second-control-signal output terminal of the control unit, the scan test terminal, the data test terminal, the plurality of data lines, and the plurality of scan lines; the second detection unit is configured to receive a second control signal from the second-control-signal output terminal; and the second detection unit is configured to, based on the second control signal, receive the test scan signal from the scan test terminal and transmit the test scan signal to the plurality of pixel units, and receive the test data signal from the data test terminal and transmit the test data signal to the plurality of pixel units, to control the plurality of pixel units to perform image display.

13. The display panel of claim 12, wherein the first detection unit comprises a plurality of first switch transistors and a plurality of second switch transistors; gates of the plurality of first switch transistors are connected to the first-control-signal output terminal, sources of the plurality of first switch transistors are connected to the scan test terminal, and drains of the plurality of first switch transistors are connected to the plurality of scan lines, respectively; and the plurality of first switch transistors are configured to, based on the first control signal, be turned on, receive the test scan signal from the scan test terminal, and transmit the test scan signal to the plurality of pixel units; and gates of the plurality of second switch transistors are connected to the first-control-signal output terminal, sources of the plurality of second switch transistors are connected to the data test terminal, and drains of the plurality of second switch transistors are connected to the plurality of data lines, respectively; and the plurality of second switch transistors are configured to, based on the first control signal, be turned on, receive the test data signal from the data test terminal, and transmit the test data signal to the plurality of pixel units.

14. The display panel of claim 13, wherein the second detection unit comprises a plurality of third switch transistors and a plurality of fourth switch transistors; gates of the plurality of third switch transistors are connected to the second-control-signal output terminal, sources of the plurality of third switch transistors are connected to the scan test terminal, and drains of the plurality of third switch transistors are connected to the plurality of scan lines, respectively; and the plurality of third switch transistors are configured to, based on the second control signal, be turned on, receive the test scan signal from the scan test terminal, and transmit the test scan signal to the plurality of pixel units; and gates of the plurality of fourth switch transistors are connected to the second-control-signal output terminal, sources of the plurality of fourth switch transistors are connected to the data test terminal, and drains of the plurality of fourth switch transistors are connected to the plurality of data lines, respectively; and the plurality of fourth switch transistors are configured to, based on the second control signal, be turned on, receive the test data signal from the data test terminal, and transmit the test data signal to the plurality of pixel units.

15. The display panel of claim 14, wherein the display panel comprises a display region and a non-display region adjacent to each other; the first detection unit and the second detection unit are adjacent to each other and arranged on the non-display region at a same side of the display region; the plurality of first switch transistors and the plurality of third switch transistors are arranged sequentially in a one-to-one correspondence; sources of any corresponding pair of a first switch transistor of the plurality of first switch transistors and a third switch transistor of the plurality of third switch transistors are connected to the scan test terminal, and drains of any corresponding pair of the first switch transistor and the third switch transistor are connected to a same scan line, to asynchronously transmit the test scan signal;

the plurality of second switch transistors and the plurality of fourth switch transistors are arranged sequentially in a one-to-one correspondence; sources of any corresponding pair of a second switch transistor of the plurality of second switch transistors and a fourth switch transistor of the plurality of fourth switch transistors are connected to the data test terminal, and drains of any corresponding pair of the second switch transistor and the fourth switch transistor are connected to a same data line, to asynchronously transmit the test data signal.

16. The display panel of claim 11, comprising a first data test terminal, a second data test terminal, a first scan test terminal, a second scan test terminal, a plurality of scan lines extending in a first direction, and a plurality of data lines extending in a second direction, wherein the first direction is different from the second direction;

the first detection unit is connected to the first scan test terminal, the first data test terminal, the plurality of data lines, and the plurality of scan lines; the first detection unit is configured to, based on a control signal output by the control unit, receive a first test scan signal from the first scan test terminal and transmit the first test scan signal to the plurality of pixel units and receive a first test data signal from the first data test terminal and transmit the first test data signal to the plurality of pixel units, to control the plurality of pixel units to perform image display; and the second detection unit is connected to the second scan test terminal, the second data test terminal, the plurality of data lines, and the plurality of scan lines; the second detection unit is configured to, based on the control signal, receive a second test scan signal from the second scan test terminal and transmit the second test scan signal to the plurality of pixel units and receive a second test data signal from the second data test terminal and transmit the second test data signal to the plurality of pixel units, to control the plurality of pixel units to perform image display.

17. A method for fault detection, applicable to a fault detection circuit, wherein the fault detection circuit comprises a first detection unit, a second detection unit, and a control unit, wherein the control unit is connected to the first detection unit and the second detection unit; the first detection unit is configured to perform a short-circuit detection or an open-circuit detection on pixel units in a display panel under control of the control unit; the control unit is configured to control the second detection unit to re-execute a detection in response to at least one pixel unit displaying abnormally and being determined as a first abnormal pixel unit; in response to the second detection unit detecting that the first abnormal pixel unit displays normally, the first detection unit is determined to be faulty; and in response to the second detection unit detecting that the first abnormal pixel unit displays abnormally, the first abnormal pixel unit is determined to be faulty; and wherein the method for fault detection comprises:

controlling the first detection unit to perform the short-circuit detection or the open-circuit detection on the pixel units in the display panel;

determining that the pixel units are not faulty in response to the first detection unit detecting that all the pixel units display normally;

determining the at least one pixel unit as the first abnormal pixel unit and controlling the second detection unit to re-execute the detection in response to the first detection unit detecting that the at least one pixel unit displays abnormally;

determining that the first detection unit is faulty in response to the second detection unit detecting that the first abnormal pixel unit displays normally; and determining that the first abnormal pixel unit is faulty in response to the second detection unit detecting that the first abnormal pixel unit displays abnormally.

18. The method for fault detection of claim 17, wherein controlling the second detection unit to re-execute the detection comprises:

controlling the second detection unit to re-execute the detection on pixel units in a display region;

wherein determining that the first detection unit is faulty in response to the second detection unit detecting that the first abnormal pixel unit displays normally comprises:

determining that the first abnormal pixel unit is not faulty and the first detection unit is faulty in response to the second detection unit detecting that all the pixel units display normally.

19. The method for fault detection of claim 17, wherein a pixel unit that displays abnormally during the detection by the second detection unit is determined as a second abnormal pixel unit; and in response to the first abnormal pixel unit being different from the second abnormal pixel unit detected by the second detection unit, the first detection unit and the second abnormal pixel unit are determined to be faulty.

20. The display panel of claim 17, wherein the display panel comprises a display region and a non-display region adjacent to each other; wherein the first detection unit and the second detection unit are arranged opposite to each other, and are respectively arranged on the non-display region at different sides of the display region.

* * * * *